(12) United States Patent
Kaishian et al.

(10) Patent No.: US 7,212,406 B2
(45) Date of Patent: May 1, 2007

(54) COOLING OF ELECTRICAL COMPONENTS WITH SPLIT-FLOW CLOSED-END DEVICES

(75) Inventors: Steven C. Kaishian, Wauwatosa, WI (US); Daniel C. Pixler, West Bend, WI (US); Timothy A. Roebke, Milwaukee, WI (US); Scott D. Day, Richfield, WI (US); William K. Siebert, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 297 days.

(21) Appl. No.: 10/931,896

(22) Filed: Sep. 1, 2004

(65) Prior Publication Data

US 2006/0044742 A1    Mar. 2, 2006

(51) Int. Cl.
*H05K 7/20* (2006.01)
(52) U.S. Cl. .................. 361/699; 336/61; 165/80.4; 165/104.33
(58) Field of Classification Search ............... None
See application file for complete search history.

(56) References Cited

U.S. PATENT DOCUMENTS

| | | | | |
|---|---|---|---|---|
| 4,956,626 A | * | 9/1990 | Hoppe et al. | 336/60 |
| 5,313,037 A | * | 5/1994 | Hansen et al. | 219/632 |
| 5,463,528 A | * | 10/1995 | Umezawa | 361/699 |
| 5,465,192 A | * | 11/1995 | Yoshikawa | 361/705 |
| 5,757,258 A | * | 5/1998 | Krichtafovitch et al. | 336/65 |
| 6,674,164 B1 | * | 1/2004 | Rippel et al. | 257/713 |
| 6,966,359 B1 | * | 11/2005 | Liu | 165/104.21 |
| 7,027,290 B1 | * | 4/2006 | Thrap | 361/502 |
| 7,031,161 B2 | * | 4/2006 | Miettinen et al. | 361/704 |

\* cited by examiner

*Primary Examiner*—Boris Chervinsky
(74) *Attorney, Agent, or Firm*—Quarles & Brady LLP; Alexander M. Gerasimow

(57) ABSTRACT

A cooling system (11) is provided for electrical components (10, 90) in which passageways (21) are inserted in non-magnetic cores of the electrical components, and in which the passageways (21) provide both inflow and outflow of a cooling medium. The passageways (21) can be formed by drilling holes in a core of an electrical component or by mounting closed-end tubes (16–19) on a base plate-cooling manifold (20) or can be part of a conduit assembly (70). The tubes (16–19, 71) are split-flow closed-end tubes inserted from one end of the electrical component (10, 90). The tubes and passageways (16–19, 21, 71) may be partitioned into two halves or into two concentric portions. O-ring seals (28) are provided around the base of the tubes to seal the areas where the passageways communicate with hollow portions of base plates for supplying the cooling medium.

21 Claims, 15 Drawing Sheets

COOLING OF ELECTRICAL COMPONENTS WITH SPLIT-FLOW CLOSED-END DEVICES

CROSS-REFERENCE TO RELATED APPLICATIONS

Not Applicable

STATEMENT REGARDING FEDERALLY SPONSORED RESEARCH

Not Applicable

TECHNICAL FIELD

The field of the invention is cooling systems and methods for electrical control equipment and components.

BACKGROUND ART

Recent developments in hybrid vehicles and defense applications have increased the demand for cooling systems for electrical control equipment and components.

The cooling of electrical components lowers their temperature of operation and increases their electrical efficiency and power output per unit size. Electrical resistance, for example, increases with heating and causes the equipment to be less efficient. The size and weight of electrical components can be reduced for a given power rating, provided that operating temperatures are kept within a certain range of ambient temperature by the use of cooling systems.

It is typical to mount electrical controls in enclosures. Cooling of the electrical equipment is also beneficial in that removes heat from such enclosures and in some cases allows for sealed enclosures.

One category of electrical components includes inductors which are electromagnetic devices having an electromagnetic core, often made of ferromagnetic metal, and coils with many turns of electrical wire. These include transformers, choke coil assemblies and many other devices using such electromagnetic components. Other components, such as capacitors, can also be cooled.

In the prior art, many solutions to cooling such devices have included air cooling with radiating fins attached to the components. Traditional, air-cooled inductors are volumetrically inefficient. Large surface areas are required to reject the heat. The large size of these components has significant weight. Sealed boxes containing inductors of considerable size cannot be adequately air-cooled.

In liquid cooled devices, several approaches have been used. Sometimes tubes have been wrapped around the cores with the wiring for the coils. In some cases, the coils have been immersed in liquids within their enclosures.

When conventional plumbing is added to a choke coil assembly, the plumbing must be assembled after winding the choke coils, pressure tested and then returned to the choke coil manufacturing area to be impregnated with resin.

It is an object of the invention to provide a cooling system that can be separately manufactured, tested and then easily assembled to the choke coil or other electrical component.

SUMMARY OF THE INVENTION

The invention relates a cooling system for an electrical component in which split-flow elements are provided as part of a cooling assembly that can be inserted into tubes or blind-end holes in an inductor, capacitor or other electrical component. In the prior art it has been typical either to provide conduits through the magnetic core or to provide conduits around the outside of the coils.

The split-flow elements can be provided with bisectional dividers or concentric (coaxial) dividers to divide an inflow portion of a passageway from an outflow portion of a passageway. The passageways communicate with a cooling base plate with hollow portions for circulating a cooling fluid or are part of a conduit assembly having a supply conduit portion.

This approach allows the cooling system to be manufactured separately from the electrical component and then assembled with the electrical component(s).

The present invention allows the liquid-cooled inductors to be smaller and of less weight. It also minimizes internal heating of a closed container. It allows redirection of heat energy outside of the system to a desired heat exchanging location.

The invention will lower the losses due to heat, reduce internal enclosure temperature, reduce the size of fans that remove heat and other electrical components, and will allow for lower temperature rated components.

The invention will reduce the heat load of internal devices upon the "thermal rejection" system.

The invention will allow for smaller inductors due to increased allowable flux density, smaller cores and smaller coil wire size.

The invention will be a smaller device, which reduces shipping weight, required package structural strength, and material mass. All of these factors translate to decreased cost.

The invention is also applicable to other electrical components such as capacitors.

These and other objects and advantages of the invention will be apparent from the description that follows and from the drawings which illustrate embodiments of the invention, and which are incorporated herein by reference.

DETAILED DESCRIPTION

Figure 1:
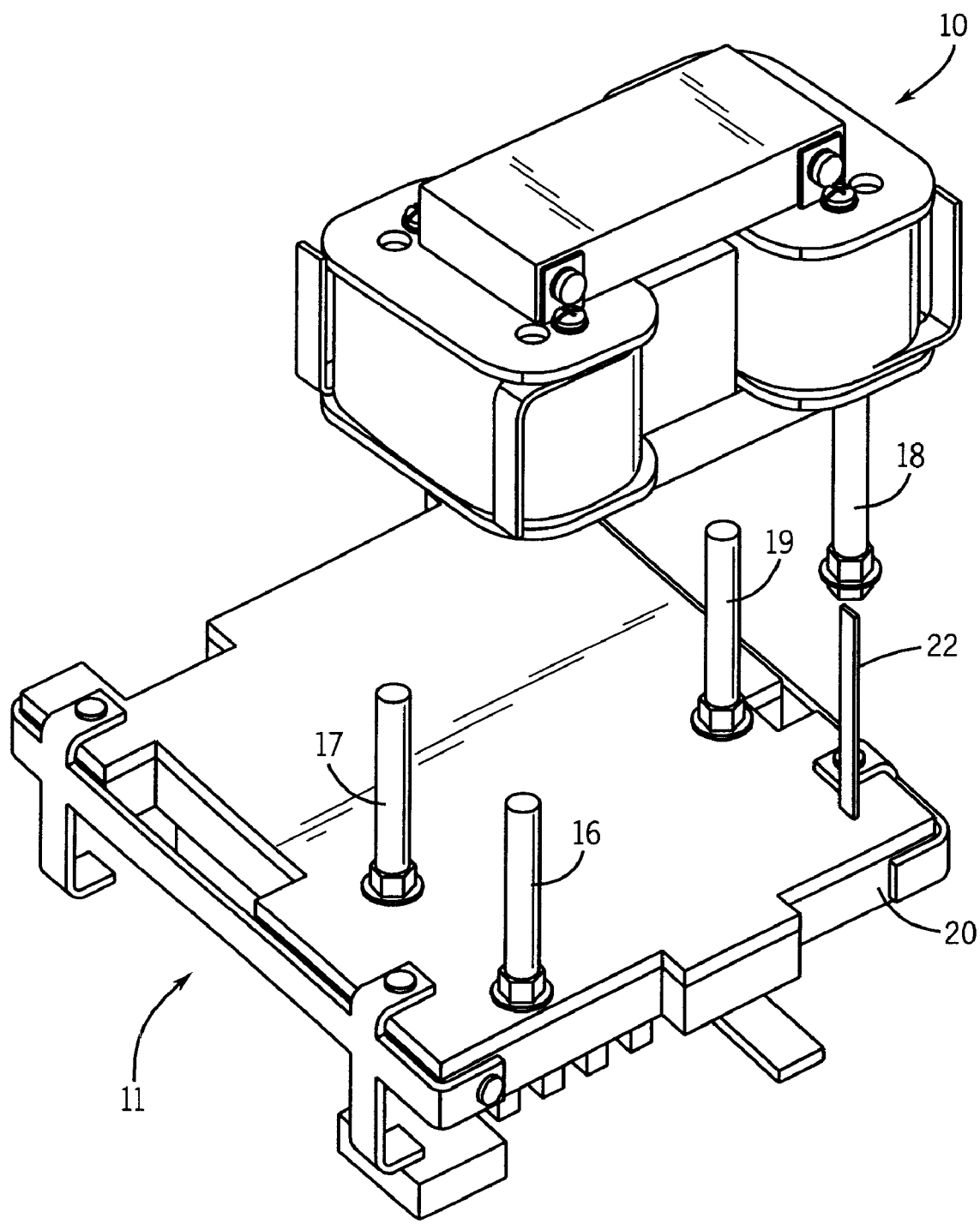
FIG. 1 is a perspective assembly view of a first embodiment of the invention.
Figure 2:
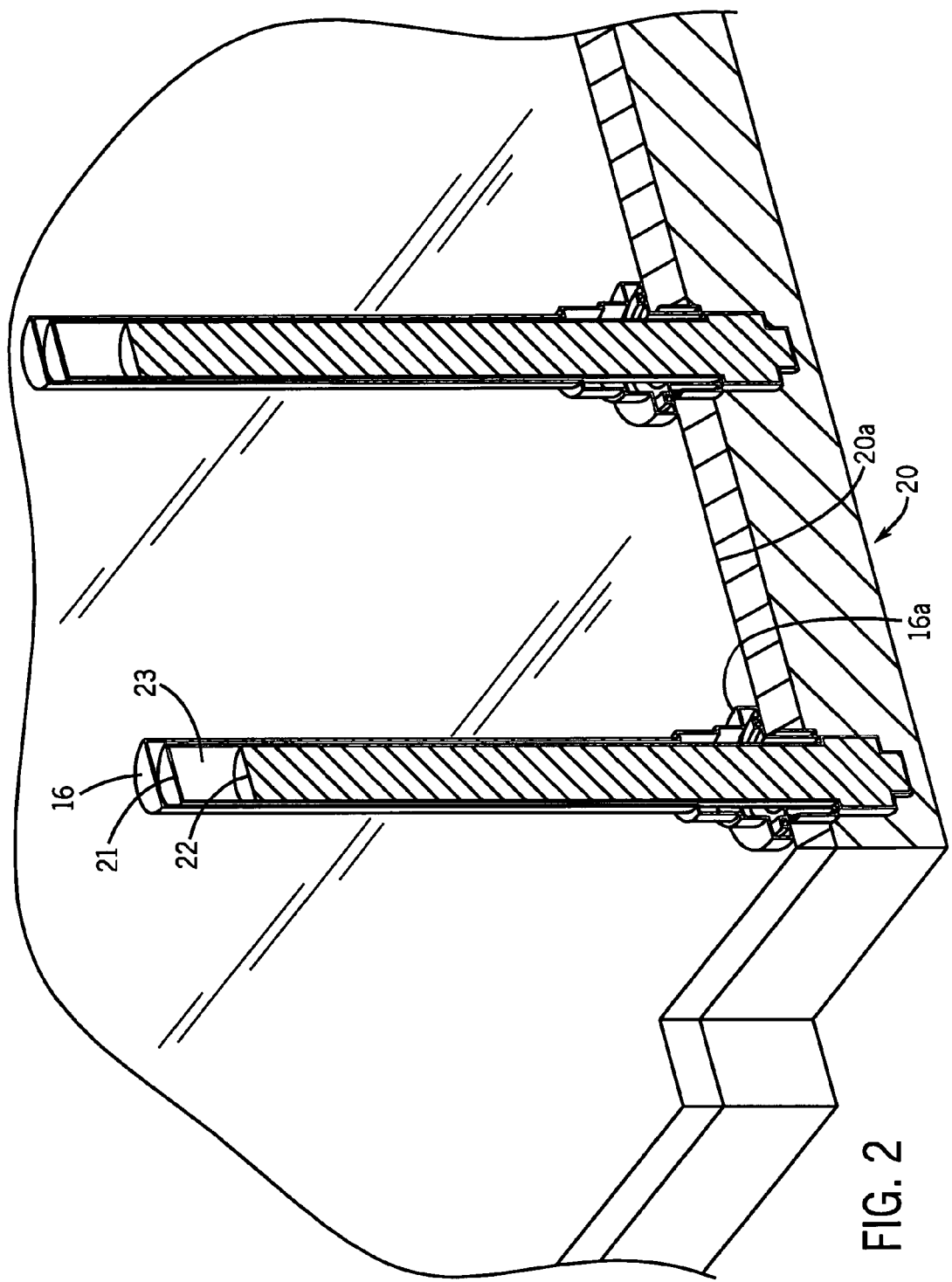
FIG. 2 is a detail sectional view of a cooling tube portion of the assembly of FIG. 1.
Figure 3:
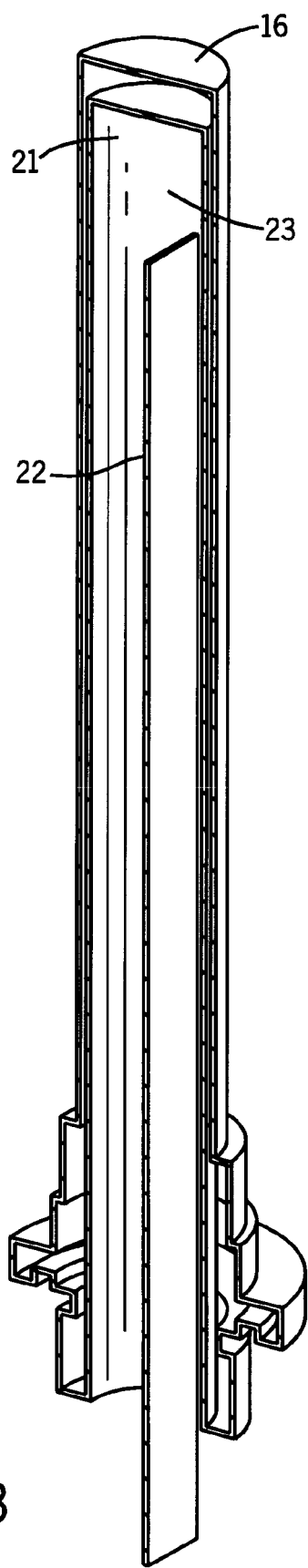
FIG. 3 is detail sectional view of the cooling tube of FIG. 2 taken in a plane that is orthogonal to the section in FIG. 2.

FIG. 1 illustrates an inductor assembly 10, which is a choke coil assembly, and which is constructed according to the present invention. The choke coil assembly 10 has a cooling assembly 11 for circulating a cooling fluid. The cooling assembly 11 is referred to as a "split-flow, closed-end" type of assembly because its has tubes that are closed at one end and open at an opposite end where the flow is split into an incoming flow and an outgoing flow by a divider within the tube. The cooling assembly 11 provides cooling to the inductor assembly 10. This cooling assembly 11 includes four closed end tubes 16, 17, 18, 19, rising from a base plate-cooling manifold 20. These tubes 16–19 are hollow and have open ends for attachment to the base plate-cooling manifold 20, either by threaded connections or by welding. A closed-end tube 16 (a tube with one closed end), as seen in FIGS. 2 and 3, is inserted from underneath the top surface 20a of the base plate 20 and has a sidewall (represented by two closely space light lines in FIGS. 2 and 3) that encloses a passageway 21 inside the electrical component. Each closed-end tube 16–19 has a bisecting partition member 22 that splits the flow into halves with the split flow communicating through a lateral passageway 23 above the partition near an upper end of the passageway 21 to allow the incoming flow to change direction and become the outgoing flow. Although the tubes 16–19 herein are shown as cylindrical, as used herein the term "tubes" should be understood to have other possible cross-sectional shapes such as rectangular.

Figure 4:
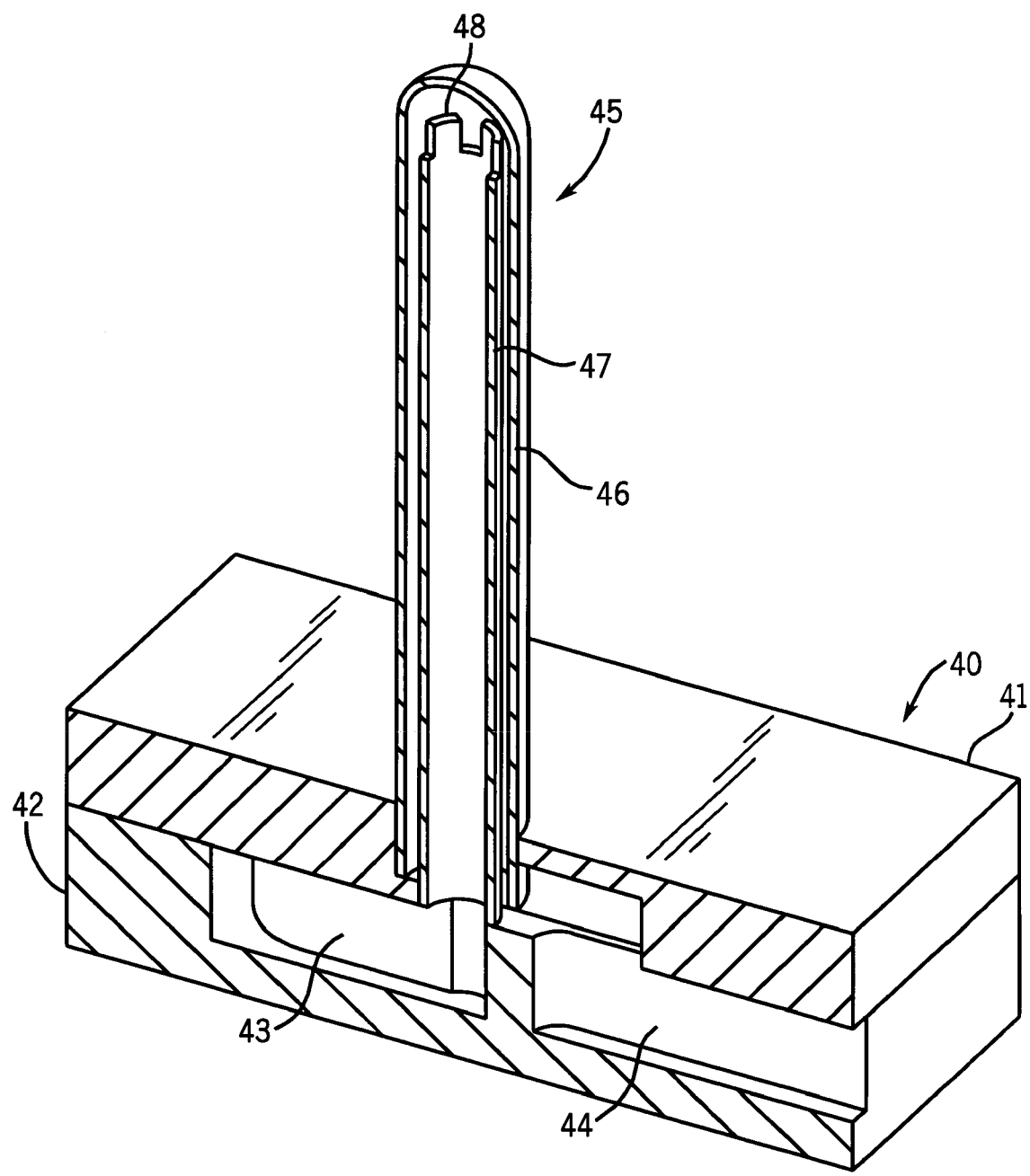
FIG. 4 is a detail sectional view of a variation of the cooling tube portion of FIG. 2.

FIG. 4 shows a variation of the assembly in FIGS. 1–3 in which a base plate 40 has an upper portion 41 and a lower portion 42 with respective passages 43, 44 for communicating with an inflow portion and an outflow portion of a tube 45 having a concentric flow divider 47 inside its outer wall 46. The inflow portion carries a relatively cooler flow, which reverses through lateral passageway 48 and becomes an outgoing flow for absorbing heat from the electrical component. In this variation, both flows communicate with the lower portion 42 of the base plate 40, the outflow passing through a passage in the upper portion 41 into the lower portion 42.

Figure 5:
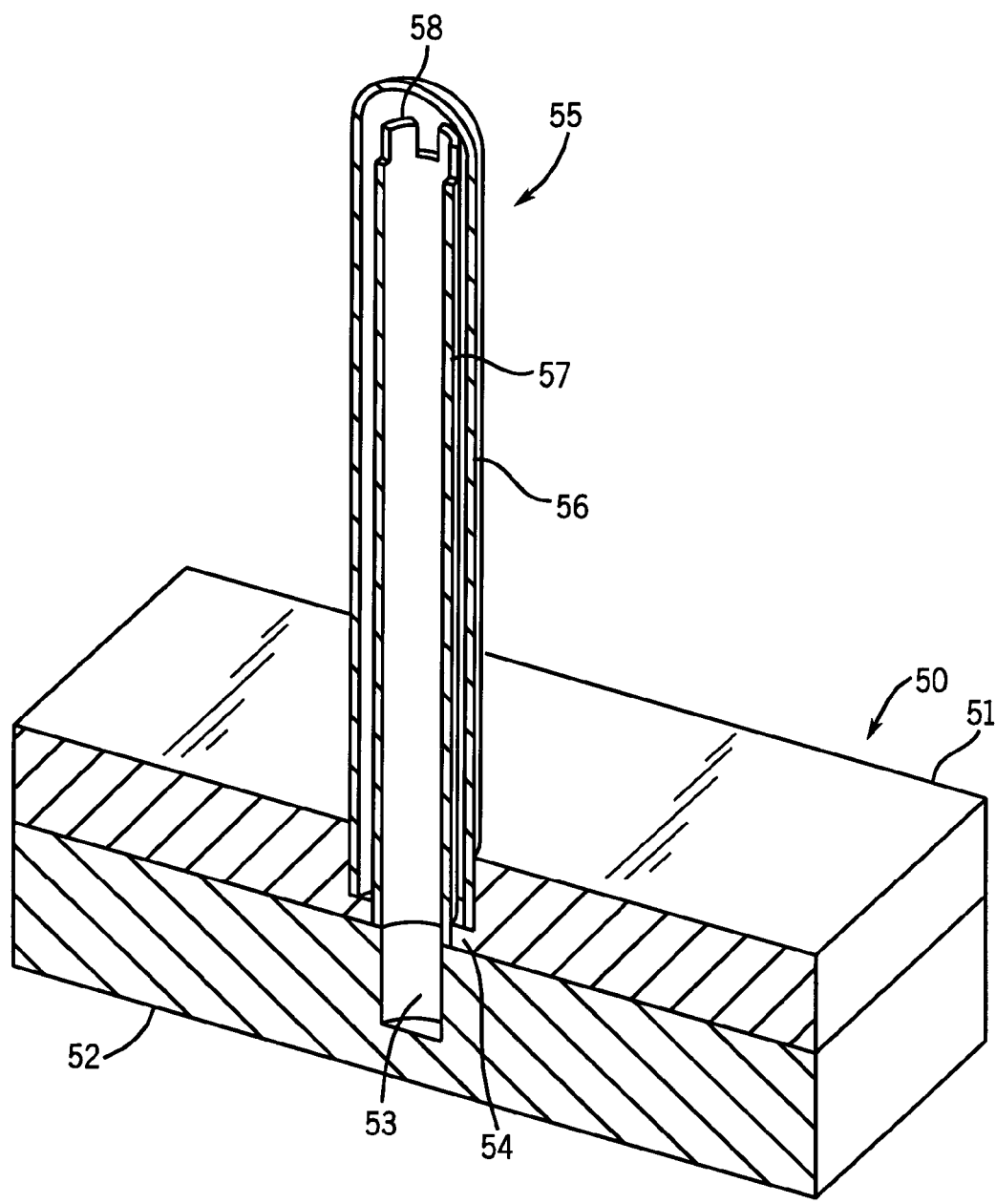
FIG. 5 is a detail sectional view of a variation of the cooling tube portion of FIG. 4.

FIG. 5 shows a variation of the assembly in FIG. 4 in which a base plate 50 has an upper portion 51 and a lower portion 52 with respective passages 53, 54 for communicating with in inflow portion and an outflow portion of a tube 55 having a concentric flow divider 57 inside its outer wall 56. The inflow portion carries a relatively cooler flow, which reverses through lateral passageway 58 and becomes an outgoing flow for absorbing heat from the electrical component. In this variation, the incoming flow comes from the lower portion 52 of the base plate 50 while the outgoing flow goes to the upper portion 51 of the base plate.

Figure 6:
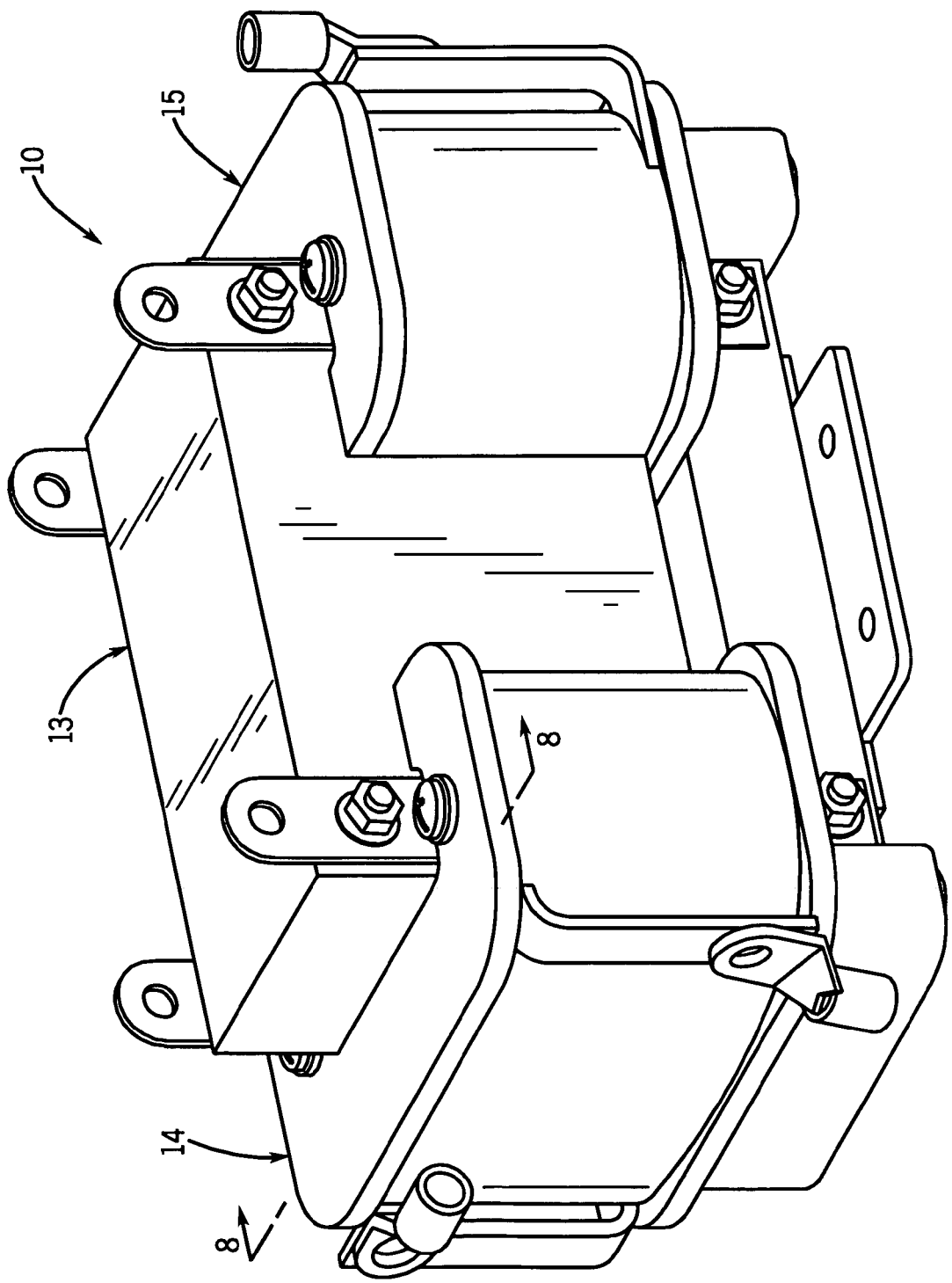
FIG. 6 is front perspective view of a second embodiment of the present invention.

FIG. 6 shows an inductor assembly 10 with a three-legged core 13 and two coil assemblies 14, 15. The detailed construction of the coil assemblies is described in a copending application assigned to the assignee herein, filed on even date herewith and entitled "Core Cooling for Electrical Components," the disclosure of which is hereby incorporated by reference.

Figure 7:
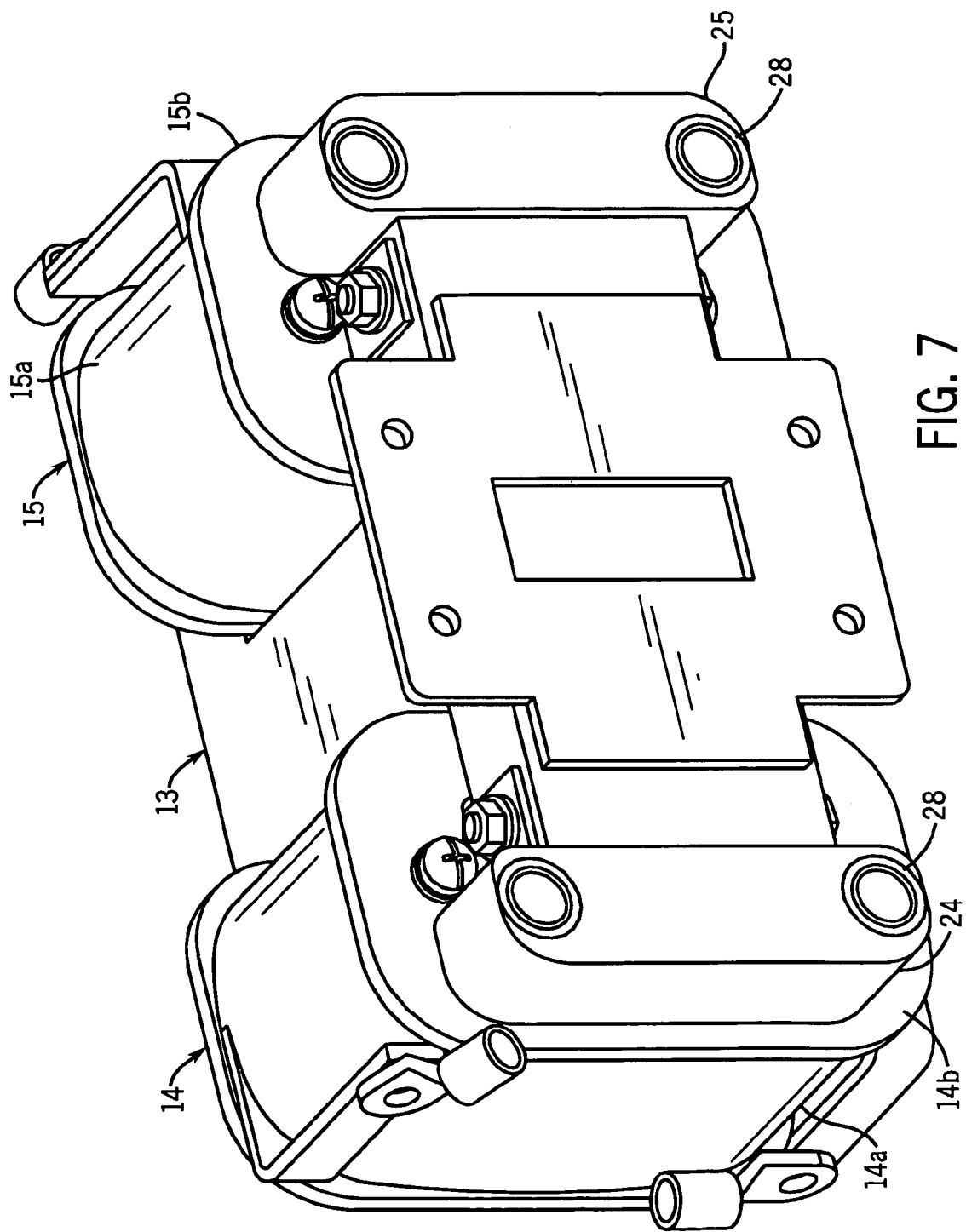
FIG. 7 is a bottom perspective view of the inductor assembly seen in FIG. 6.
Figure 8:
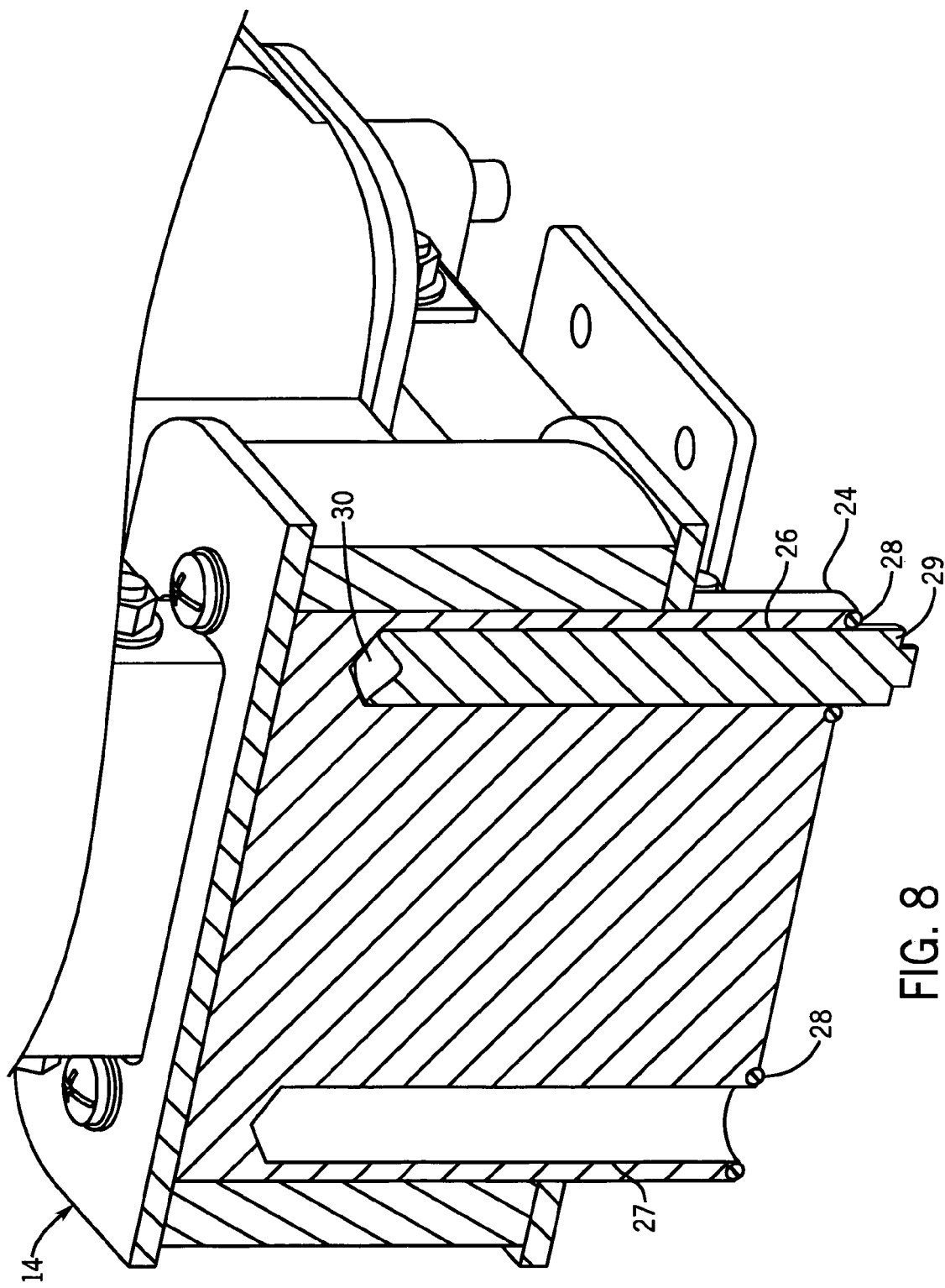
FIG. 8 is a sectional view of the inductor assembly seen in FIG. 6 taken in the plane indicated by line 8—8 in FIG. 6.
Figure 9:
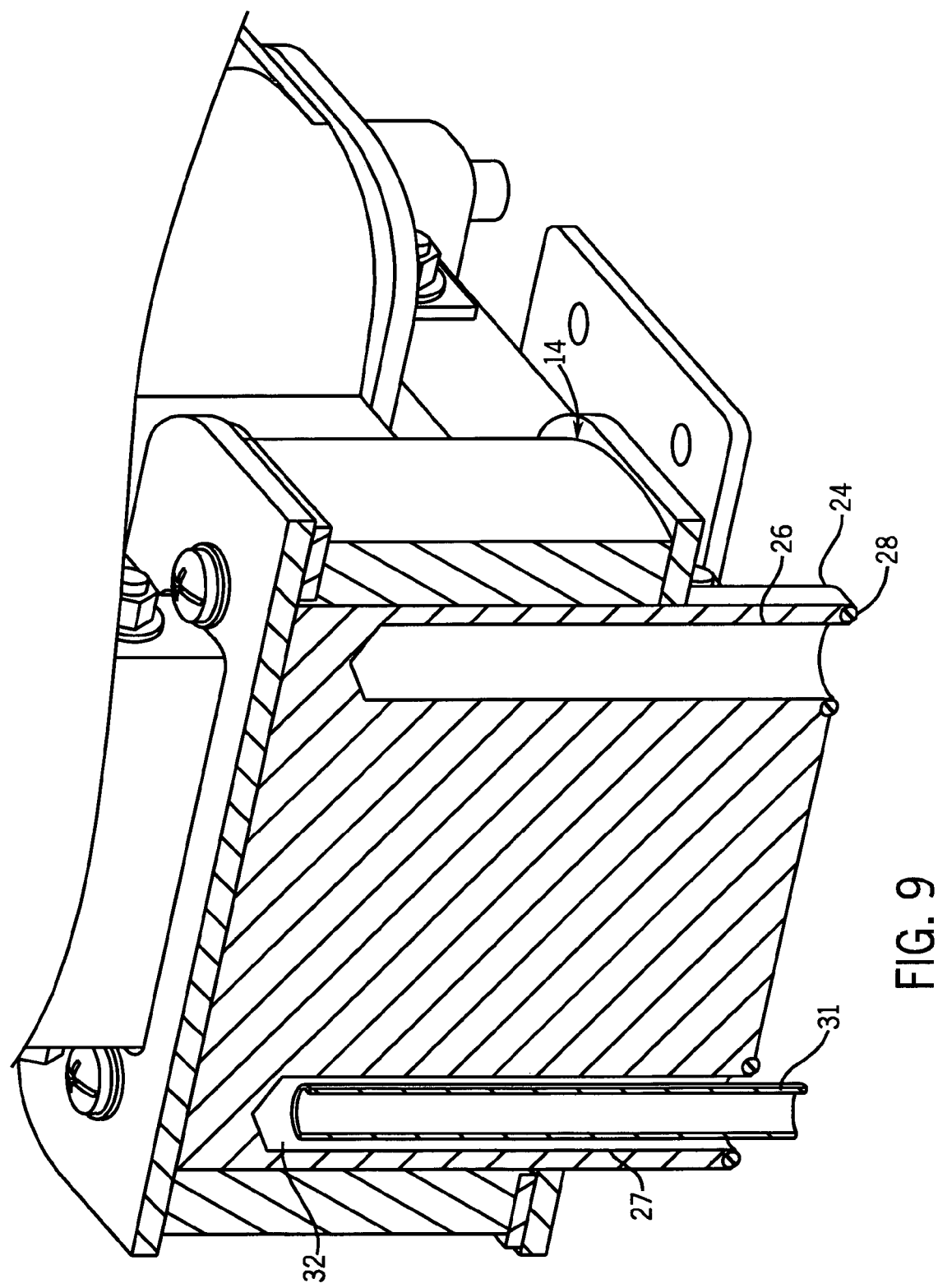
FIG. 9 is a sectional view of the inductor assembly seen in FIG. 6 taken in the same plane as FIG. 8 with a modification to the split flow divider.

As seen in FIG. 7, the bobbins 24, 25 in the two coil assemblies extend lower than the coils 14a, 15a and the lower dielectric end piece 14b, 15b of the coil assemblies 14, 15. As seen in FIGS. 7 and 8, blind-end passageways 26, 27 are drilled in the bobbin cores 24, 25. O-rings 28 are used to seal the location where the passageways 26, 27 open into hollow portions of the base plate (not shown) in FIGS. 7 and 8). The passageways 26, 27 each have a partition 29 positioned in their interior for dividing the flow into a split flow comprising an incoming flow and an outgoing flow. The passageways 26, 27 each have a lateral passageway 30 proximate their closed end for permitting the incoming flow to change direction and become the outgoing flow. FIG. 9 shows that the partition 31 can be a concentric tubular partition of smaller diameter than the passageways 26, 27 for dividing the flow into two coaxial flows, one being an incoming flow and the other being an outgoing flow. The incoming flow changes to outgoing flow at the internal lateral passageway 32 for connecting the two flows.

Figure 10:
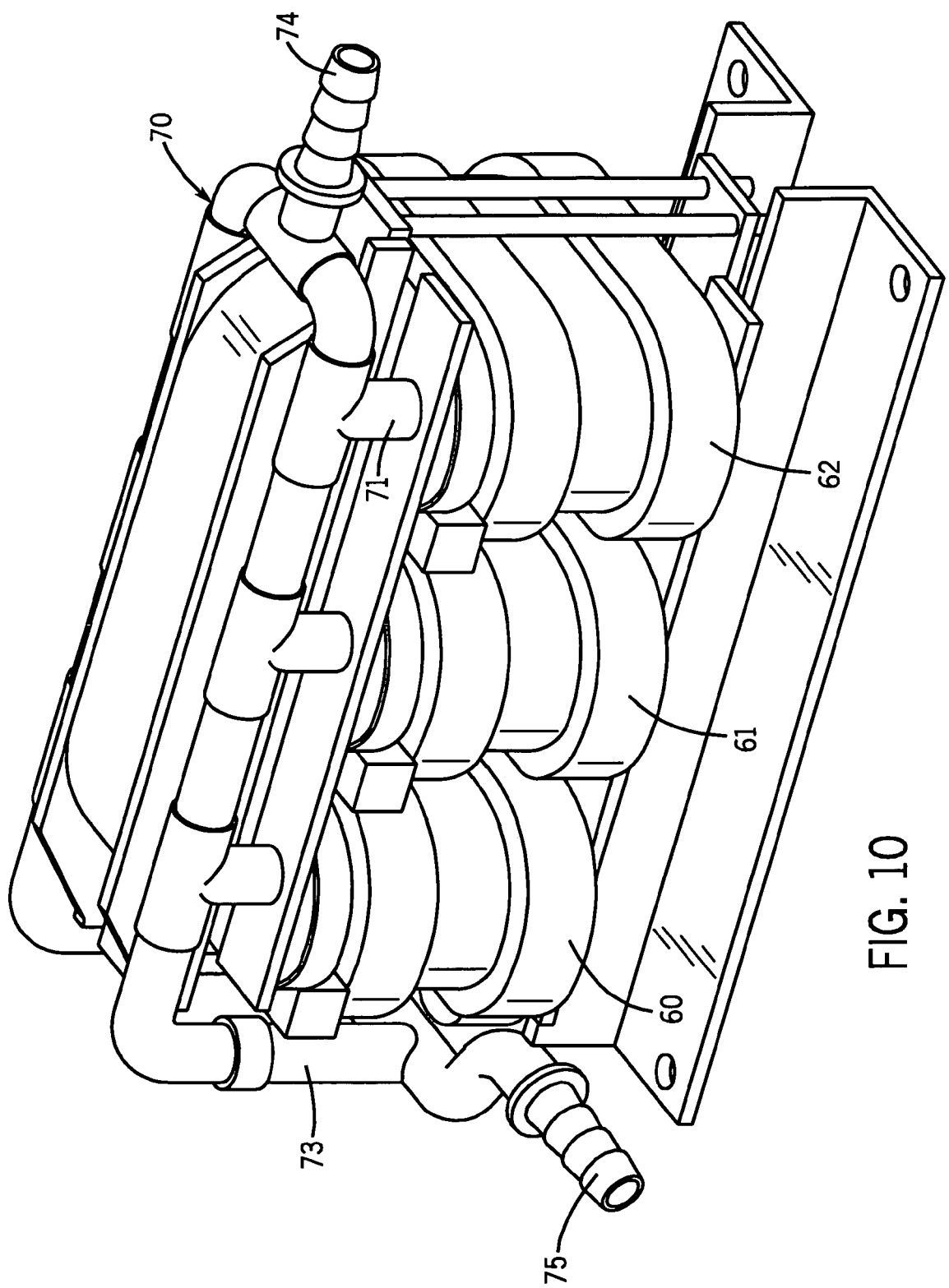
FIG. 10 is a perspective view of a third embodiment of the present invention.
Figure 11:
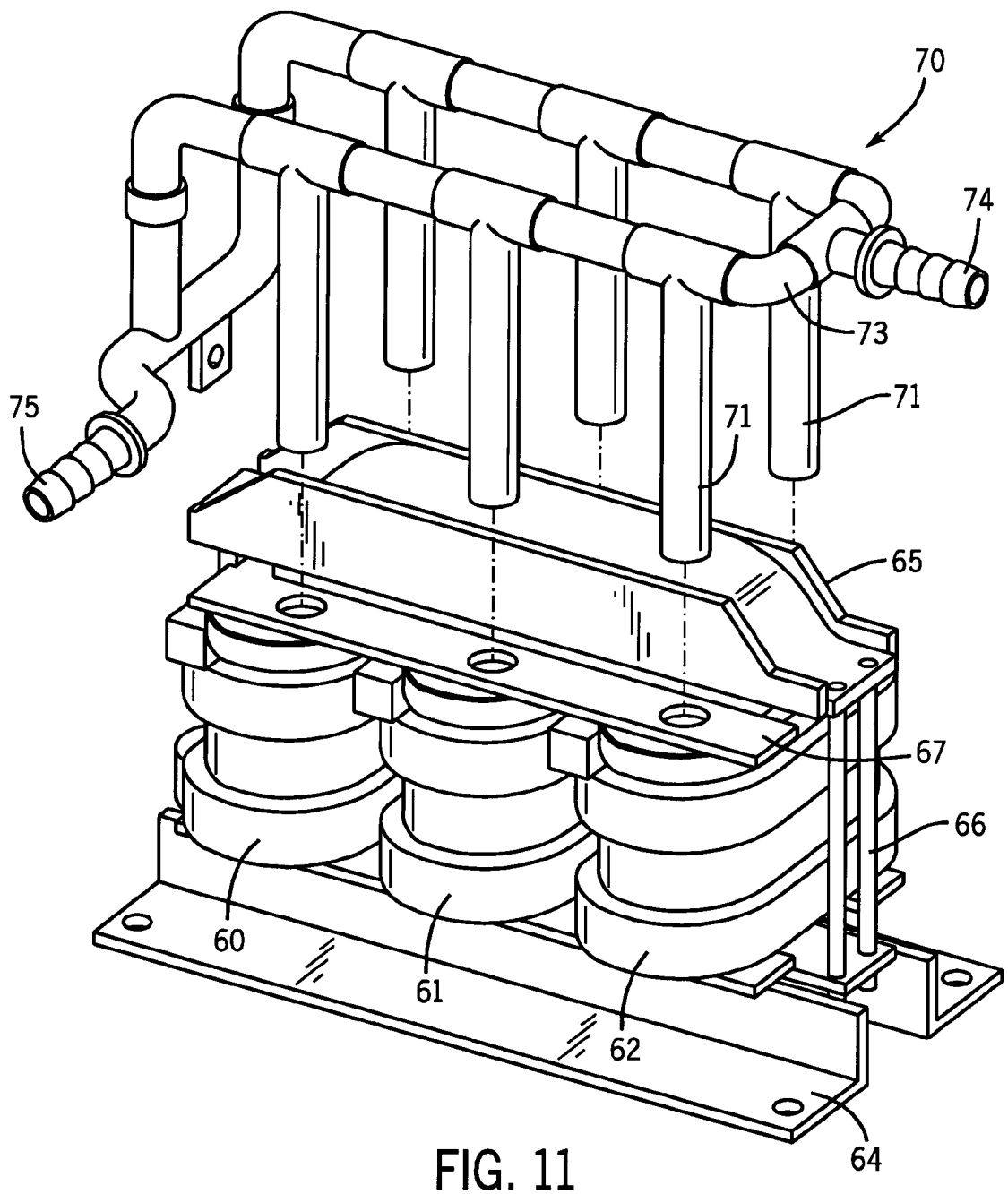
FIG. 11 is a partially exploded perspective view of the assembly of FIG. 10.
Figure 12:
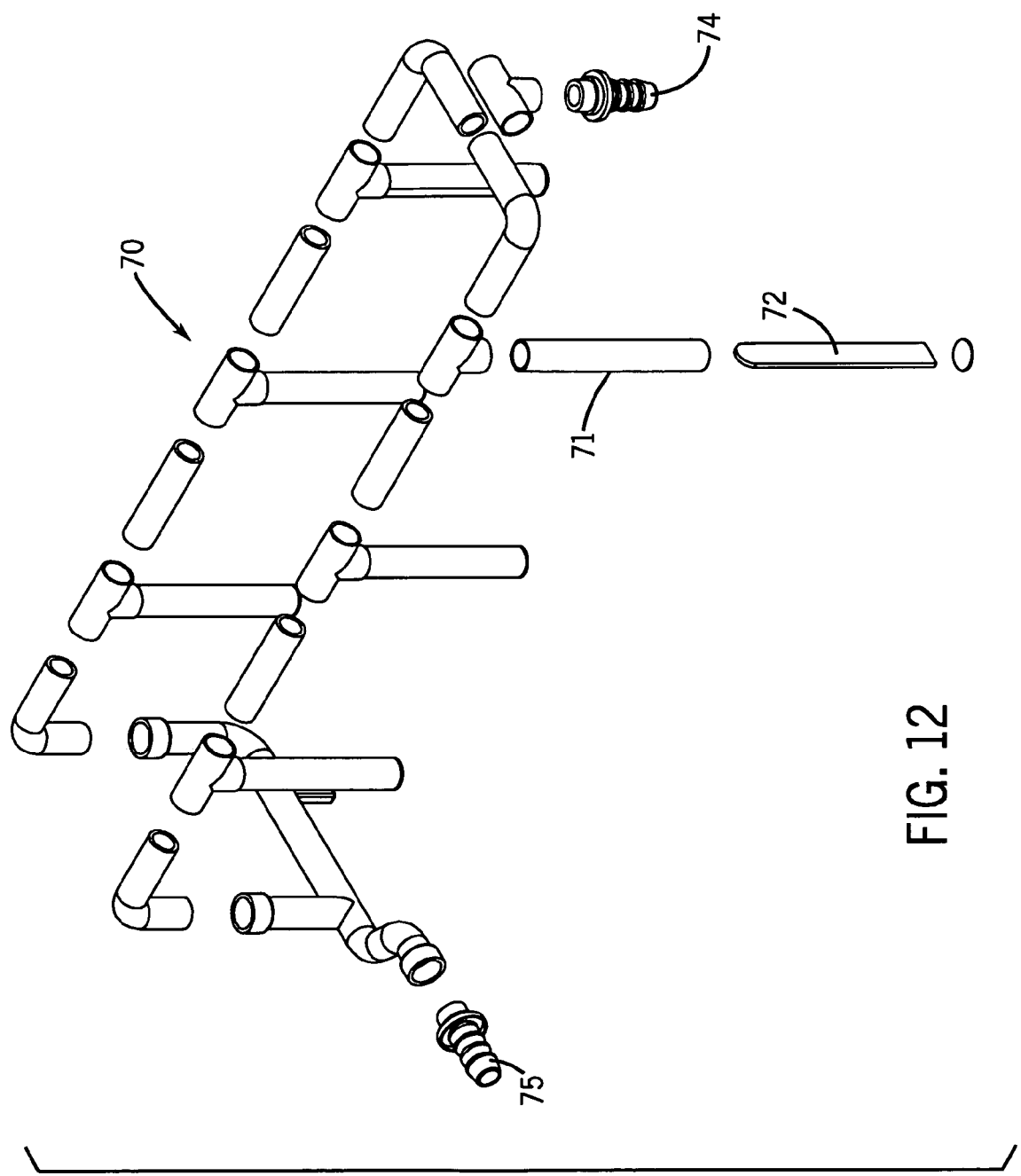
FIG. 12 is an exploded view of portion of a subassembly seen in FIG. 11.

FIGS. 10 and 11 show a construction of coil assemblies 60, 61 and 62 without a fluid circulating base plate in which a conduit assembly 70 with closed-end tubes 71 is inserted from the top. The conduit assembly 70 has six closed-end tubes 71 with split flow provided by bisecting dividers 72 seen in FIG. 12. A loop conduit 73 in two orthogonal planes is provided to supply and return fluid between inlet and outlet 74, 75. The tubes 71 are also orthogonal to the supply conduit 73. The coil assemblies 60, 61 and 62 are supported on a base plate 64 and held in place with a bracket 65 and long bolts 66. A retaining member 67 with six holes is disposed over holes in the coil assemblies 60, 61 and 62 to receive the closed-end tubes 71.

Figure 13:
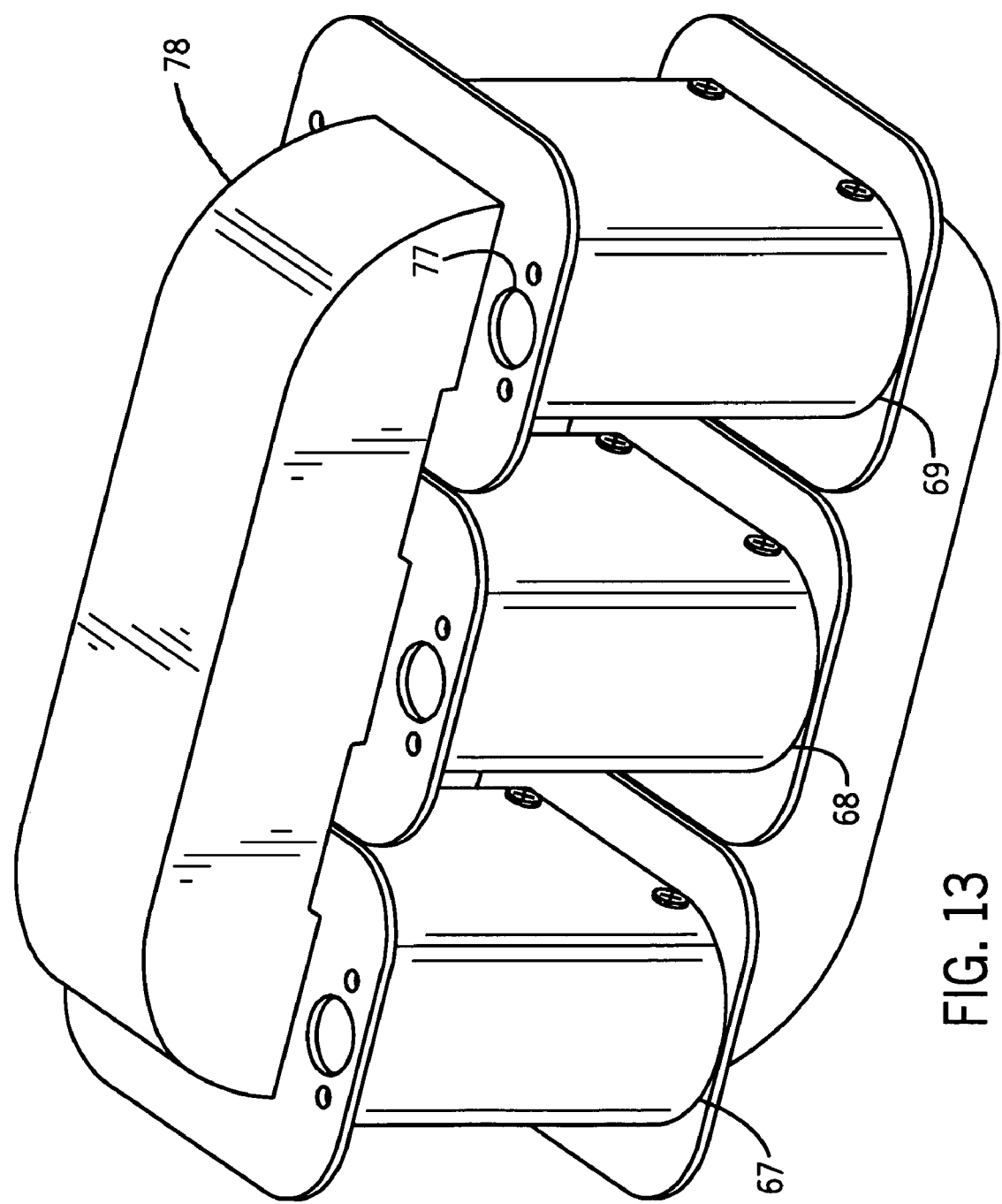
FIG. 13 is a perspective view of another subassembly seen in FIGS. 10 and 11.
Figure 14:
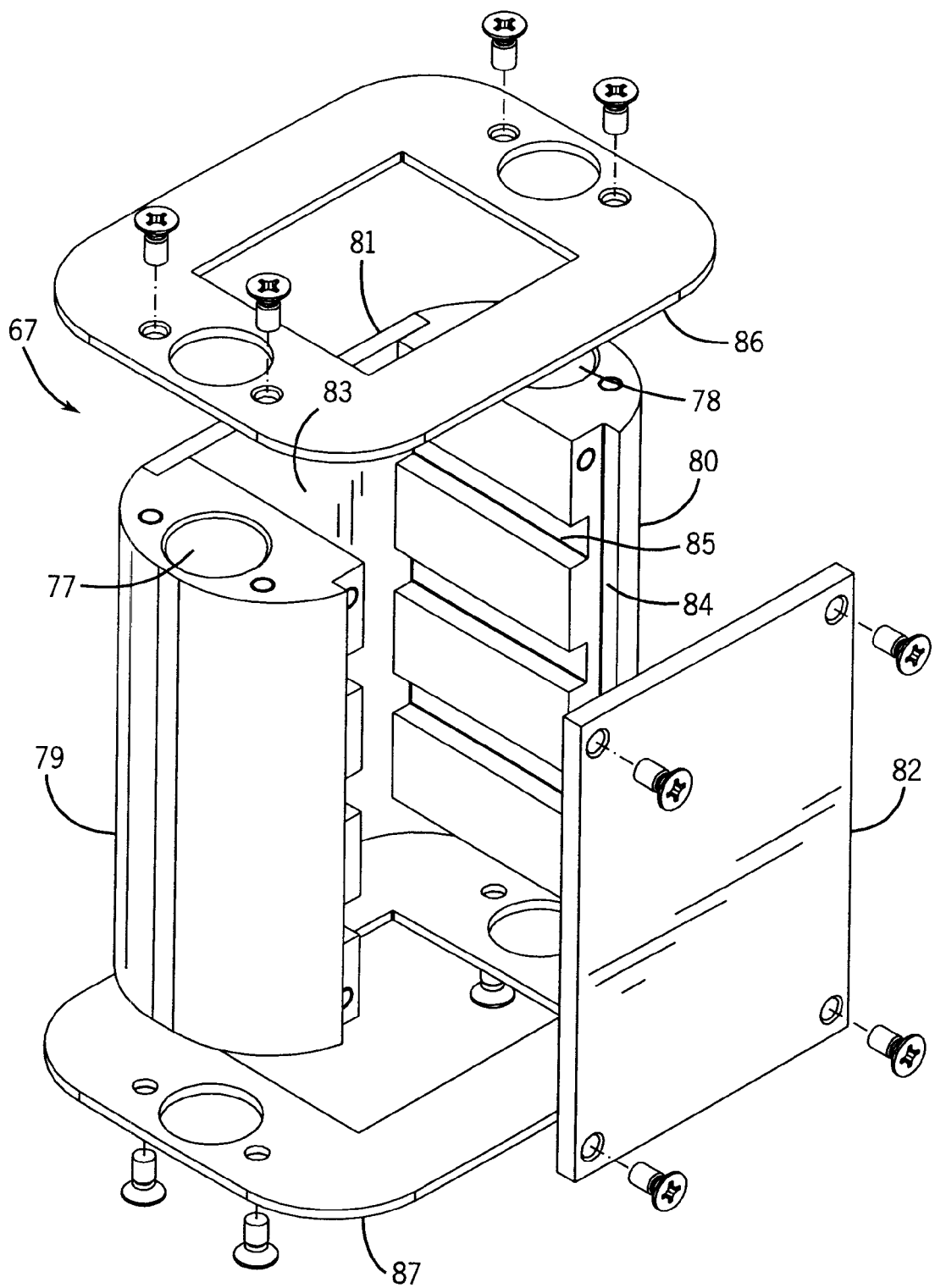
FIG. 14 is a detail exploded view of one of the subassemblies seen in FIG. 13.

FIGS. 13 and 14 show the three bobbin assemblies 67, 68 and 69 with the coils removed. Each bobbin assembly 67, 68, 69 has passageways 77, 78 passing through it parallel to a central axis for the bobbin and along an axis of symmetry from front to back of the bobbin assembly. As seen in FIG. 14, the bobbin assembly 67 has two bobbin core pieces 79, 80 of conducting, but non-ferromagnetic material, such as aluminum, spaced apart by planar spacer members 81, 82 of dielectric material as well as by a central cavity 83. The edges of the planar spacer members 81, 82 fit in grooves 84 formed in the core pieces 79, 80. The core pieces 79, 80 have transverse grooves 85 formed in them to reduce fringing effects. End pieces 86, 87 of dielectric material are attached to opposite ends of the core 79–82. One leg of the ferromagnetic core would extend through the central cavity 83 of each bobbin core assembly 79–82.

Figure 15:
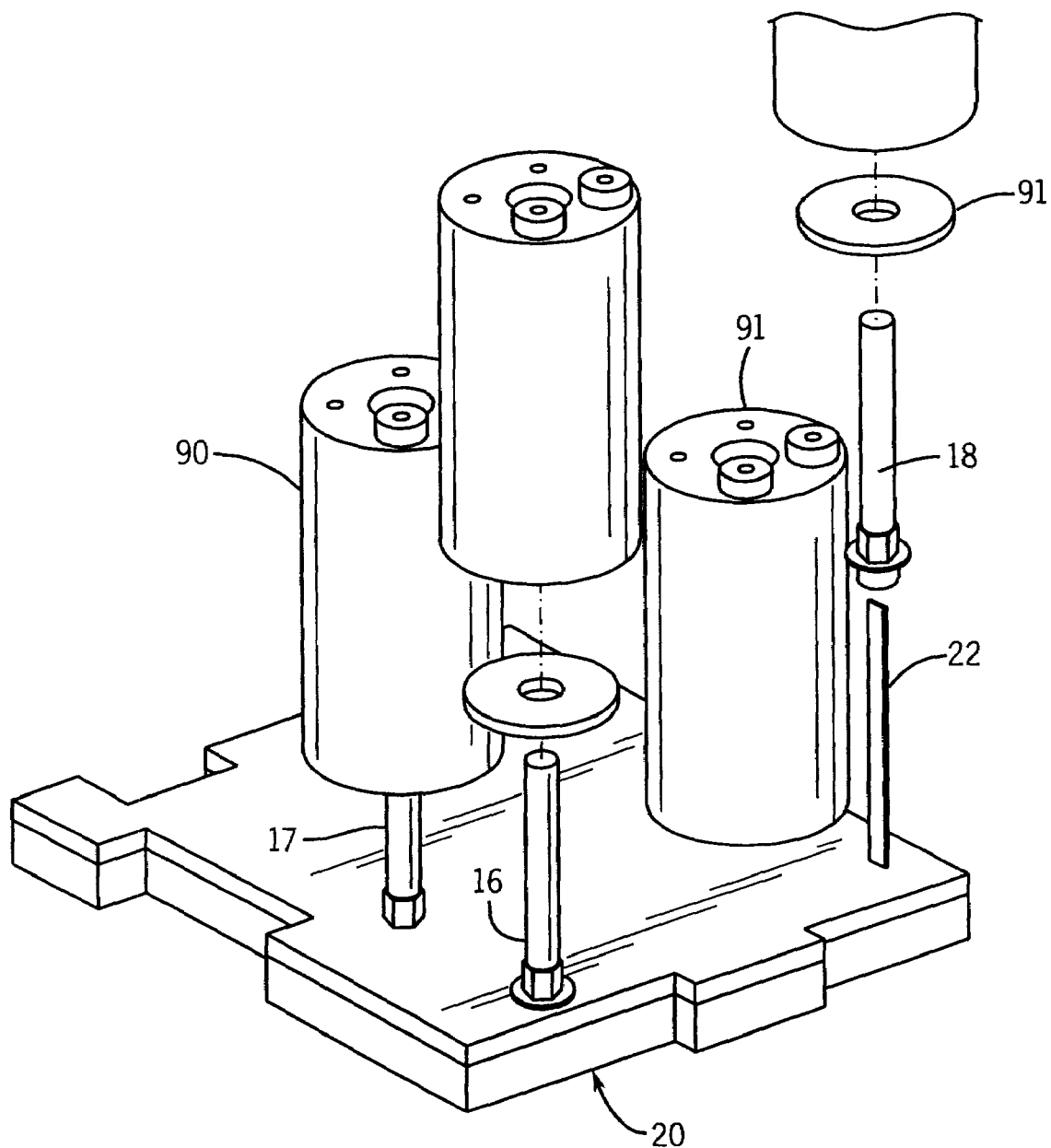
FIG. 15 shows a cooling assembly of the present invention used to cool capacitive components.

FIG. 15 shows a cooling base plate assembly 20 as seen in FIG. 1 for cooling capacitors 90. The closed-end tubes 16–19 reach into the cores of the capacitors 90. This capacitor core is made of non-magnetic material and an annular member of dielectric material is disposed around the capacitor core. A pair of end pieces of dielectric material 91 are disposed on opposite ends of the capacitor 90. There is at least one hole is formed in one of the end pieces 91 and passes into the core in a direction normal to the electrical component. This passageway accepts a closed-end split-flow tube 16–19 for a cooling medium as shown in FIGS. 2 and 3 for circulating the cooling medium within the core to cool the capacitor 90.

Thus, the principles of the present invention may be applied to other electrical components besides inductors. Also, heat pipes can be used instead of the closed-end tubes. In heat pipes, the fluid is often aided by wicking action of a wicking medium and a liquid often changes phase between liquid and a vapor.

This has been a description of several preferred embodiments of the invention. It will be apparent that various modifications and details can be varied without departing from the scope and spirit of the invention, and these are intended to come within the scope of the following claims.

We claim:

1. An assembly comprising:
   an electrical component configured to receive operational power and having a body extending from a first end to a second end;
   a supply portion including a hollow portion for circulation of a cooling medium;
   at least a first passageway extending into the body of the electrical component through the first end and having one end that is an open end proximate the supply portion for receiving the cooling medium and an opposite end extending away from the supply portion into the body of the electrical component, the opposite end being a closed end;
   a partition extending into the at least first passageway to divide the flow at the open end into a split flow comprising an incoming flow and an outgoing flow; and
   an internal lateral passageway proximate the closed end to permit the incoming flow to become the outgoing flow.

2. The cooling assembly of claim 1, wherein the electrical component is an inductor.

3. The cooling assembly of claim 2, wherein the partition is a bisecting divider.

4. The cooling assembly of claim 2, wherein the partition is a coaxial divider.

5. The cooling assembly of claim 2, further comprising at least a first closed-end tube extending into the at least first passageway.

6. The cooling assembly of claim 5, wherein O-rings are provided around bases of the closed-end tubes to seal the areas where the tubes communicate with hollow portions of a base plate which provides a source of cooling medium.

7. The cooling assembly of claim 5, wherein the partition is a bisecting divider.

8. The cooling assembly of claim 5, wherein the partition is a coaxial divider.

9. The cooling assembly of claim 1, wherein the electrical component is a capacitor; and
   further comprising at least a first closed-end tube extending into the at least first passageway.

10. The cooling assembly of claim 1, wherein the supply portion is a supply tube running orthogonally to the at least first passageway and having at least a first junction with the open end of the at least first passageway.

11. The cooling assembly of claim 1, wherein the supply portion is a base plate extending along the first end of the electrical component having a hollow portion for circulating the cooling medium.

12. A method of manufacturing a cooling assembly of an electrical component, comprising the steps of:
   providing an electrical component configured to receive operational power and having a body extending from a first end to a second end;
   forming a supply portion having a hollow portion for circulation of a cooling medium;
   forming at least a first passageway extending into the body of the electrical component through the first end and having one end that is an open end proximate the supply portion for receiving the cooling medium and an opposite end extending away from the supply portion into the body of the electrical component, the opposite end being a closed end;
   forming a partition configured to extend into the at least first passageway for dividing the flow at the open end into a split flow comprising an incoming flow and an outgoing flow;
   inserting the partition into the at least first passageway forming an internal lateral passageway proximate the closed end for permitting the incoming flow to become the outgoing flow; and
   assembling the supply portion to the electrical component with the partition therein.

13. The method of claim 12, wherein the electrical component is an inductor.

14. The method of claim 12, wherein the partition is a bisecting divider.

15. The method of claim 12, wherein the partition is a coaxial divider.

16. The method of claim 12, wherein the at least first passageway includes a closed-end tube extending into the at least first passageway.

17. The method of claim 16, wherein O-rings are provided around bases of the closed-end tubes to seal the areas where the tubes communicate with hollow portions of a base plate which provides a source of cooling medium.

18. The method of claim 16, wherein the partition is a bisecting divider.

19. The method of claim 16, wherein the partition is a coaxial divider.

20. The method of claim 12, wherein the electrical component is a capacitor; and
   wherein the at least first passageway includes a closed-end tube extending into the at least first passageway.

21. The assembly of claim 1, wherein the body forms the passageway and wherein the cooling medium flows against the body.

* * * * *